United States Patent [19]

Inoue et al.

[11] Patent Number: 5,090,502
[45] Date of Patent: Feb. 25, 1992

[54] CONNECTING STRUCTURE FOR CONNECTING A POWER UNIT OF AN AUTOMOTIVE VEHICLE WITH THE BODY OF THE VEHICLE

[75] Inventors: Yasushi Inoue, Higashihiroshima; Takashi Sakono, Hiroshima, both of Japan

[73] Assignee: Mazda Motor Corporation, Hiroshima, Japan

[21] Appl. No.: 629,947

[22] Filed: Dec. 19, 1990

[30] Foreign Application Priority Data

Dec. 29, 1989 [JP] Japan .................... 1-152182[U]

[51] Int. Cl.⁵ .......................................... B62D 21/00
[52] U.S. Cl. ................................. 180/312; 180/292; 248/647
[58] Field of Search ............... 180/312, 291, 292, 295; 248/647

[56] References Cited

U.S. PATENT DOCUMENTS

| 4,449,603 | 5/1984 | Langwieder et al. | 180/312 |
| 4,564,082 | 1/1986 | Takemara et al. | 180/312 |
| 4,632,211 | 12/1986 | Le Salver et al. | 180/312 |
| 4,703,828 | 11/1987 | Mertens | 180/312 |
| 4,831,978 | 5/1989 | Iguchi et al. | 123/195 H |
| 5,035,296 | 7/1991 | Sjöstrand | 180/312 |

FOREIGN PATENT DOCUMENTS 62-123421 5/1987 Japan .

Primary Examiner—Kenneth R. Rice
Attorney, Agent, or Firm—Fish & Richardson

[57] ABSTRACT

A connecting structure for connecting a power unit of an automotive vehicle with the vehicle body, in which the power unit includes an engine and a transmission, and in which the engine has a cylinder block formed of an upper block and a lower block, in which a mount is located near the boundary of the engine and the transmission for supporting the power unit on the vehicle body so that each of the upper block and the lower block is mounted together as a unit with the transmission case by the mount.

8 Claims, 4 Drawing Sheets

CONNECTING STRUCTURE FOR CONNECTING A POWER UNIT OF AN AUTOMOTIVE VEHICLE WITH THE BODY OF THE VEHICLE

FIELD OF THE INVENTION

This invention relates to a connecting structure for connecting a power unit of an automotive vehicle with the body of the vehicle, particularly to a connecting structure in which the upper block of the engine and the lower block of the engine are mounted to the vehicle body together with a transmission case through a mounting means.

BACKGROUND OF THE INVENTION

Connecting structures for connecting a automotive power unit including an engine and a transmission with an automotive vehicle body are generally known in the art. For example, Japanese Laid-open Utility Model Application No. 62-123421 discloses a mounting structure for connecting the power unit to the vehicle body by means of four mounting elements. Usually, in the case of an engine having a cylinder block constituted of upper and lower blocks installed together with the transmission in the engine compartment of the vehicle, both the engine and the transmission are mounted against the vehicle body through a plurality of mounting means.

In such a case, however, if the stiffness of the mounting elements is not sufficient, the vibration generated by the engine and the bending movement caused between the engine and the transmission are easily transmitted to the vehicle body, and as a result, the passengers in the vehicle feel uncomfortable engine vibration.

This is especially true in the usual case in which two side mounting means are disposed at left and right sides of the power unit as seen with respect to the crank shaft which extends in the longitudinal direction of the vehicle. Such a mounting layout is likely to make the connecting rigidity of the engine and the transmission weak, since such a layout is not strong against the moment acting toward the direction along which the connecting portion of the engine and the transmission opens. As a result, the vibration of the power unit is easily transmitted to the vehicle body.

It should be noted that the above problem is more significant in a case of engines having cylinder blocks divided into upper and lower blocks, because the connecting structure between these upper and lower blocks with the transmission case becomes too complicated to maintain sufficient stiffness in the connecting portion.

SUMMARY OF THE INVENTION

It is therefore a feature of this invention to provide a connecting structure for connecting an engine and a transmission with a vehicle body which is capable of maintaining sufficient rigidity in the connecting portion between the engine and the transmission.

This is done with a connecting structure for connecting the power unit of an automotive vehicle with the vehicle body in which the engine has a cylinder block divided into an upper block and a lower block, the transmission has a transmission case and the engine and the transmission together form the power unit of the automotive vehicle. The connecting structure includes a mounting means for mounting the power unit against the vehicle body so that the mounting means connects both the upper block and the lower block with the transmission case while supporting the power unit.

DETAILED DESCRIPTION OF THE INVENTION

Figure 1:
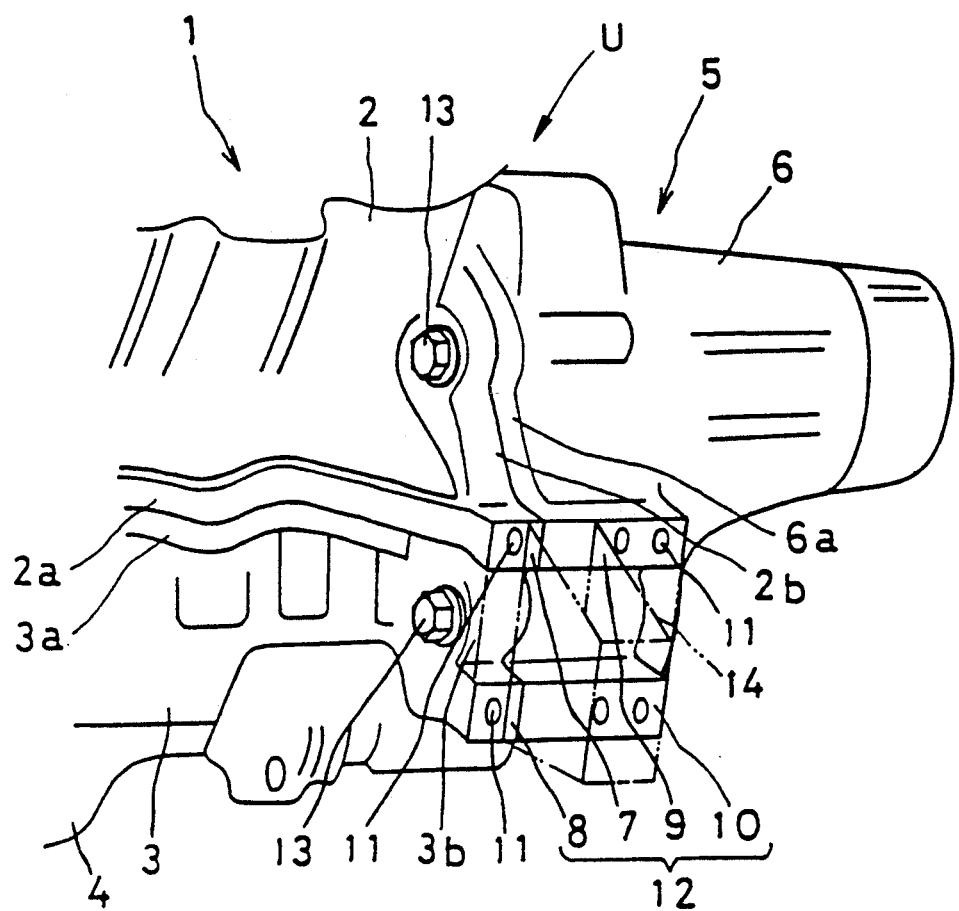
FIG. 1 is a perspective view showing a connecting structure of an engine and a transmission of a power unit in accordance with this invention.
Figure 2:
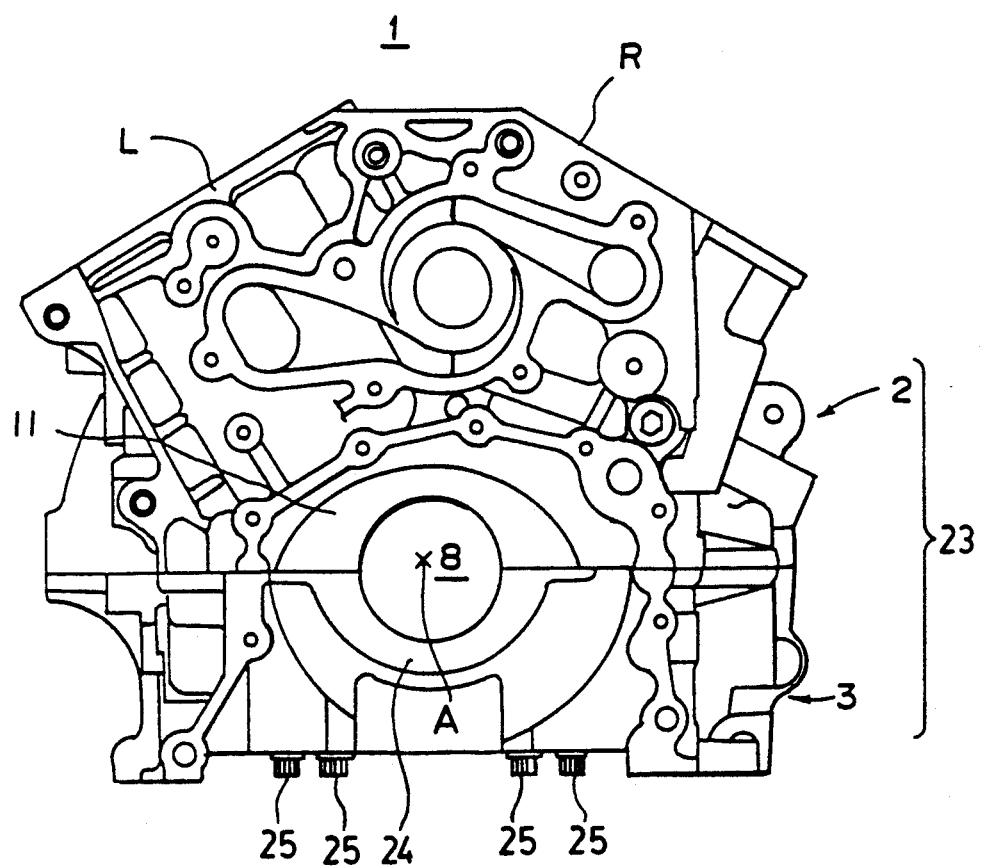
FIG. 2 is a front view showing a cylinder block which is formed with an upper block and a lower block.

FIG. 1 is a perspective view showing the connecting structure for connecting an engine and a transmission in accordance with this invention. As shown in FIG. 2, an engine 1 of a V type engine having a plurality of cylinders is divided into an upper block 2 and a lower block 3 at the height of the axis A of the engine crank shaft. The upper block 2 constitutes a V bank of the engine. The lower block 3 has a bearing cap 24 integrally formed with it. The upper block 2 has a horizontal connecting flange 2a at its lower portion, and the lower block 3 has a horizontal connecting flange 3a at its upper portion. When the upper block 2 and the lower block 3 are connected to each other by means of a plurality of connecting bolts 25 so as to form a cylinder block 23, the horizontal connecting flanges 2a and 3a act together functionally as a seal. An oil pan 4 is attached under the lower block 3 as shown FIG. 1.

A transmission 5 is disposed behind the engine 1. The transmission 5 has a transmission case 6 with a vertical connecting flange 6a.

The upper block 2 has a vertical connecting flange 2b, and the lower block 3 has a vertical connecting flange 3b. The vertical connecting flange 6a of the transmission case 6 is connected face to face with the vertical connecting flange 2b of the upper block 2 and with the vertical connecting flange 3b of the lower block 3 by means of a plurality of connecting bolts 13. In other word, the upper block 2 and the lower block 3 are bolted together to the transmission case 6 on the same plane.

The power unit U, comprising the engine 1 and the transmission 5, is supported against the vehicle body frame through four mounting elements each having a rubber element. These four mounting elements are located at left and right sides of the power unit U as one looks along axis A of the crank shaft as well as on the rear and front sides of power unit U, respectively. The left side mounting element is referred to hereinafter as a No. 1 mounting element, and the right side mounting element is referred to hereinafter as a No. 2 mounting element. The front side mounting element is referred to herein after as a No. 3 mounting element, and the rear side mounting element is referred to hereinafter as a No. 4 mounting element.

The mounting bracket for the No. 2 mounting element is the same as mounting bracket 14 for the No. 1 mounting element. Mounting bracket 14 is fixed by bolts to both the engine 1 and the transmission case 6 at the connecting portion thereof in such a manner that the upper block 2 and the lower block 3 are connected not only with each other but also with the transmission case 6 through this mounting bracket 14.

Figure 3:
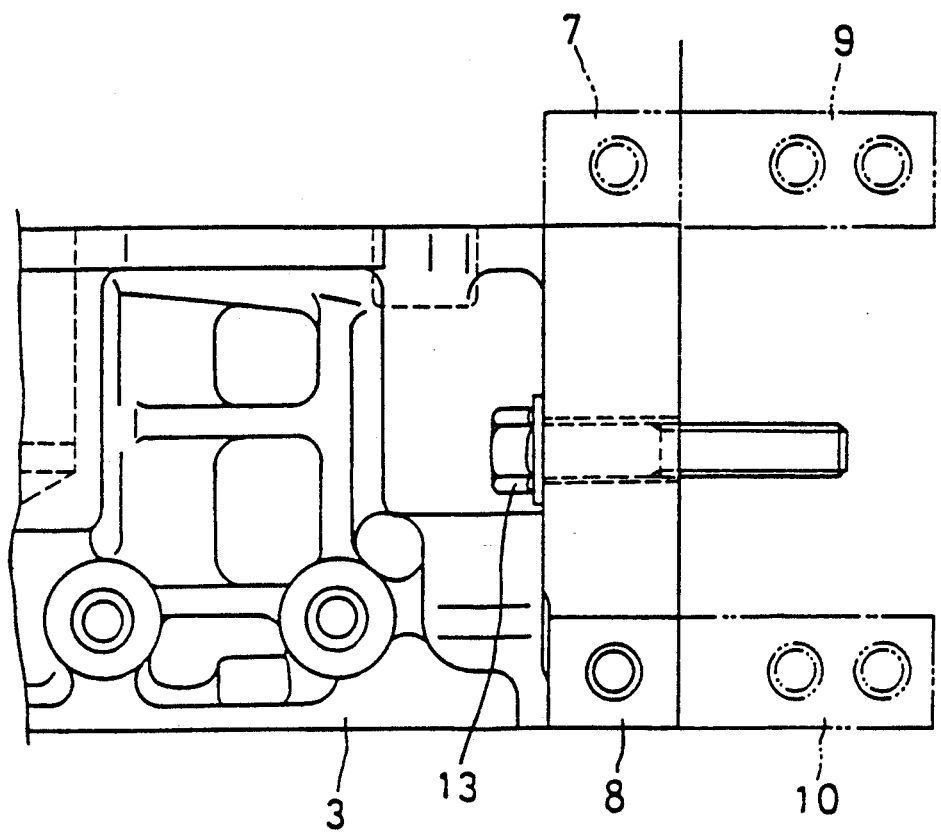
FIG. 3 is a front view showing an edge portion of the lower block.

As shown in FIGS. 1 and 3, at a rear end portion close to the vertical connecting flange 6a, the upper block 2 has a boss 7 on its rear lower side, on which a connecting surface for the mounting bracket 14 is formed. Similarly, at a rear end portion close to the vertical connection flange 6a, the lower block 3 has a boss 8 on its lower rear side, which is spaced from the boss 7 and on the top of which a connecting surface for the mounting bracket 14 is formed.

On the other hand, at front end portion close to the vertical connecting flanges 2b and 3b, the transmission case 6 has two bosses on its lower front side, which are selectively formed so as to correspond to the bosses 7 and 8, respectively. That is, the boss 9 is formed in the vicinity of the boss 7, and the boss 10 is formed in the vicinity of the boss 8. The bosses 9 and 10 are longer than the bosses 7 and 8 in the direction longitudinal to the power unit U. On the top of the bosses 9 and 10, there are formed connecting surfaces for the mounting bracket 14. All the connecting surfaces formed on the top of the bosses 7, 8, 9, and 10 are in the same plane. The area of the connecting surface formed on the bosses 9 is larger than that of the boss 7, and the area of the connecting surface formed on the boss 10 is larger than that of the boss 8.

On top of each of bosses 7 and 8, there is formed a hole 11 for threading a bolt to fasten the mounting bracket. In the same way, on top of each of bosses 9 and 10, there are formed two holes 11.

Moreover, the upper block 2 and the lower block 3 are fixed to the transmission case 6 by the plurality of connecting bolts 13 at connected flanges 2b, 3b, and 6a. At least one of these connecting bolts 13 is located so as to be sandwiched by the bosses 7, 8, 9 and 10 in a circumferential direction of the connecting flanges 2b, 3b, and 6a.

Figure 4:
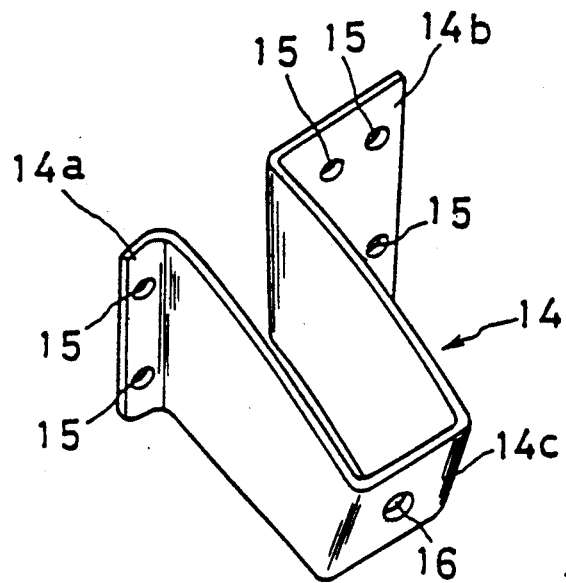
FIG. 4 is a perspective view showing a bracket for supporting the power unit of FIG. 1.

These bosses 7, 8, 9 and 10 constitute, as a unit, a mounting boss 12 for the mounting bracket 14. The mounting bracket 14 is fixed to mounting boss 12 by means of bolts 17. The mounting bracket 14 constitutes a part of an engine mounting element 22. Mounting bracket 14 is referred to hereinafter as a first mounting bracket. As shown in FIG. 4, the first mounting bracket 14 has a U-shaped configuration and has a pair of flanges 14a and 14b as a first connecting portion.

On flange 14a are provided two through holes 15 which open so as to correspond to the holes 11 formed on the tops of the bosses 7 and 8 of the upper block 2 and the lower block 3, respectively. In the same way, on the other flange 14b, there are provided four through holes 15 which are opened so as to correspond to the holes 11 formed on the tops of the bosses 9 and 10 of the transmission case 6, respectively.

Figure 5:
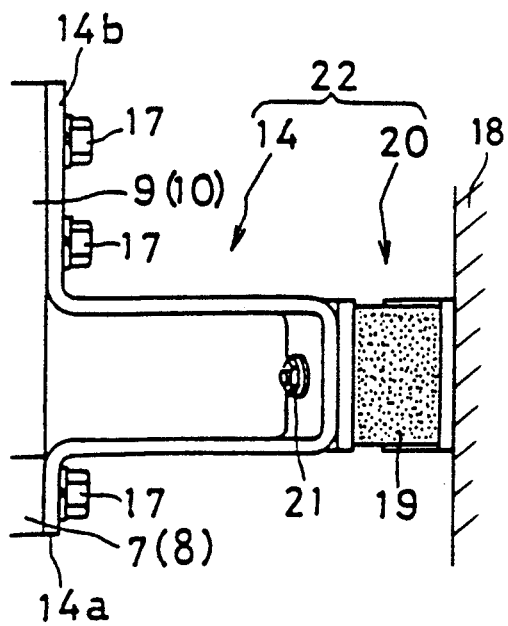
FIG. 5 is a plan view showing the bracket of FIG. 4.
Figure 6:
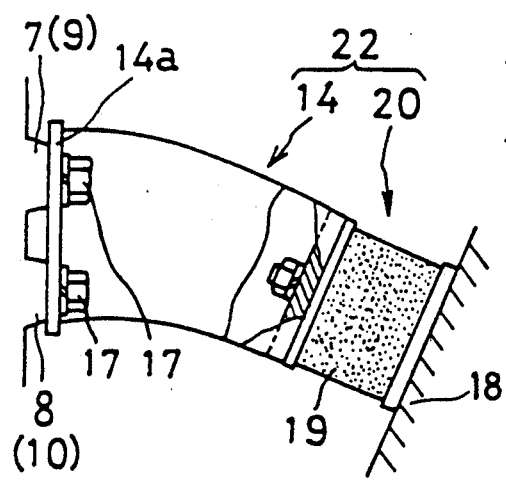
FIG. 6 is a partly broken side view showing the bracket of FIG. 4.

The first mounting bracket 14 has a base 14c as a second connecting portion between the flanges 14a and 14b. The base 14a protrudes from the plane of the flanges 14a and 14b toward vehicle body frame 18 when installed. There is provided a through hole 16 on the base 14c for inserting a bolt. The first mounting bracket 14 is fixed on the bosses 7, 8, 9, and 10 by the plurality of bolts 17 as shown in FIGS. 5 and 6.

On the other hand, on the vehicle body frame 18, a receiving mounting bracket 20 is provided. The receiving mounting bracket 20 is referred to hereinafter as a second mounting bracket. The second mounting bracket 20 accommodates a rubber element 19. The base 14c of the first mounting bracket 14 is connected with the second mounting bracket 20 by a bolt 21 inserted into through hole 16. Therefore, the power unit U can be resiliently supported against the vehicle body frame 18 through the rubber element 19.

Although the above embodiment shows a structure in which one of the bolts 13 for connecting the engine 1 and the transmission 5 is located to be sandwiched by the bosses 7, 8, 9, and 10 in the circumferential direction of the vertical connecting flanges 2b, 3b, and 6a, this bolt 13 can be located at upper or lower positions from these bosses 7, 8, 9, and 10 but in the vicinity of them. For example, in the case where the distance between boss 7 and boss 8 (or boss 9 and boss 10) is determined to be L, the vicinity or area desirable for locating the bolt 13 will range up to ⅓ (one third) of L from the nearest boss, but ½ (one-half) of L is also acceptable.

It should be apparent from the foregoing that persons skilled in this art will be able to design and modify the structure of the mounting element in accordance with this invention without departing from the basic spirit of the invention, and that this invention can be applied to types of engine other than the V-type engine.

What is claimed is:

1. A connecting structure for connecting a power unit of an automotive vehicle comprising an engine and a transmission with a vehicle body, wherein the engine has a cylinder block divided into an upper block and a lower block, the transmission has a transmission case, and said engine and said transmission together constitute the power unit of the automotive vehicle; said connecting structure comprising
   means for mounting the power unit against the vehicle body so that the mounting means connects each of the upper block and the lower block with the transmission case while supporting the power unit.

2. A connecting structure according to claim 1, wherein the mounting means comprises a bracket having a first connecting portion for connecting the upper block, the lower block and the transmission case, and a second connecting portion for connecting the mounting means to the vehicle body.

3. A connecting structure according to claim 2, wherein the first connecting portion comprises a pair of connecting flanges, and the upper block and the lower block are connected with one flange of said pair of connecting flanges and the transmission case is connected with the other of said pair of connecting flanges.

4. A connecting structure according to claim 1, wherein said upper block and the lower block are connected with the transmission case on the same plane.

5. A connecting structure according to claim 1, wherein said upper block and the transmission case are connected with each other by means of bolts, and said lower block and the transmission case are connected with each other by means of bolts.

6. A connecting structure according to claim 5, wherein one of said bolts is sandwiched, in a circumferential direction of the power unit, by a plurality of mounting bosses formed on each of the upper block and the lower block and the transmission case.

7. A connecting structure according to claim 1, wherein said lower block has a bearing cap integrally formed therewith.

8. A connecting structure according to claim 1, wherein said mounting means comprises a pair of mounting brackets, one of the mounting brackets further comprising a means made of rubber for resiliently supporting the power unit against the vehicle body.

* * * * *